April 16, 1968  J. L. STEWART  3,378,700
HIGH FREQUENCY SWITCHING SYSTEM
Filed Sept. 21, 1965  2 Sheets-Sheet 1
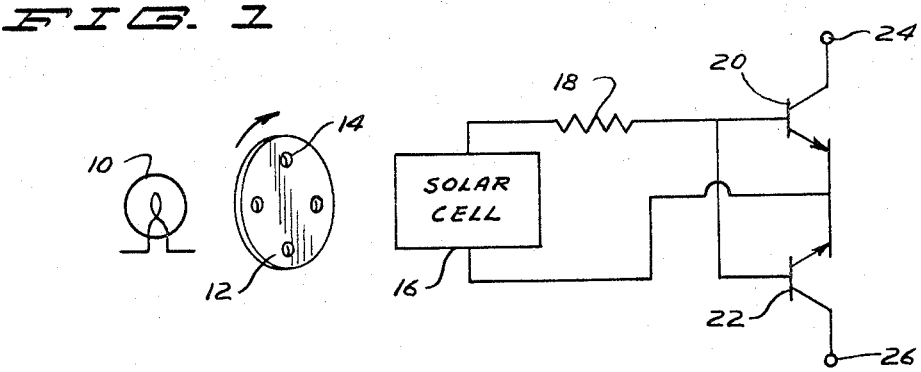
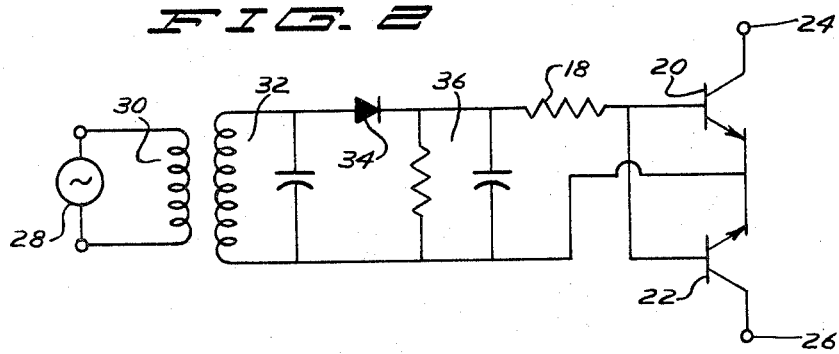
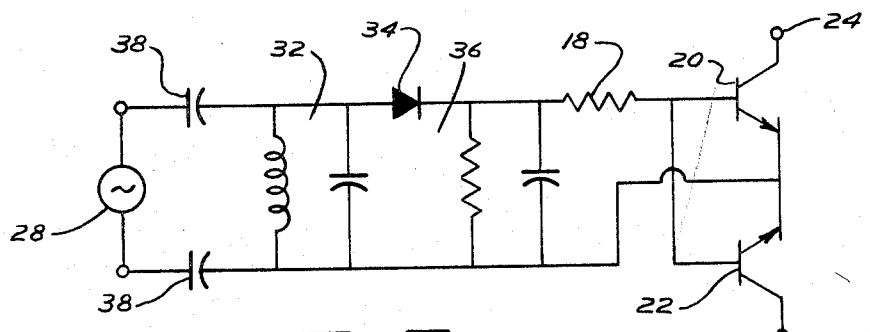
INVENTOR.
JOHN L. STEWART
BY
Meyers & Peterson
ATTORNEYS

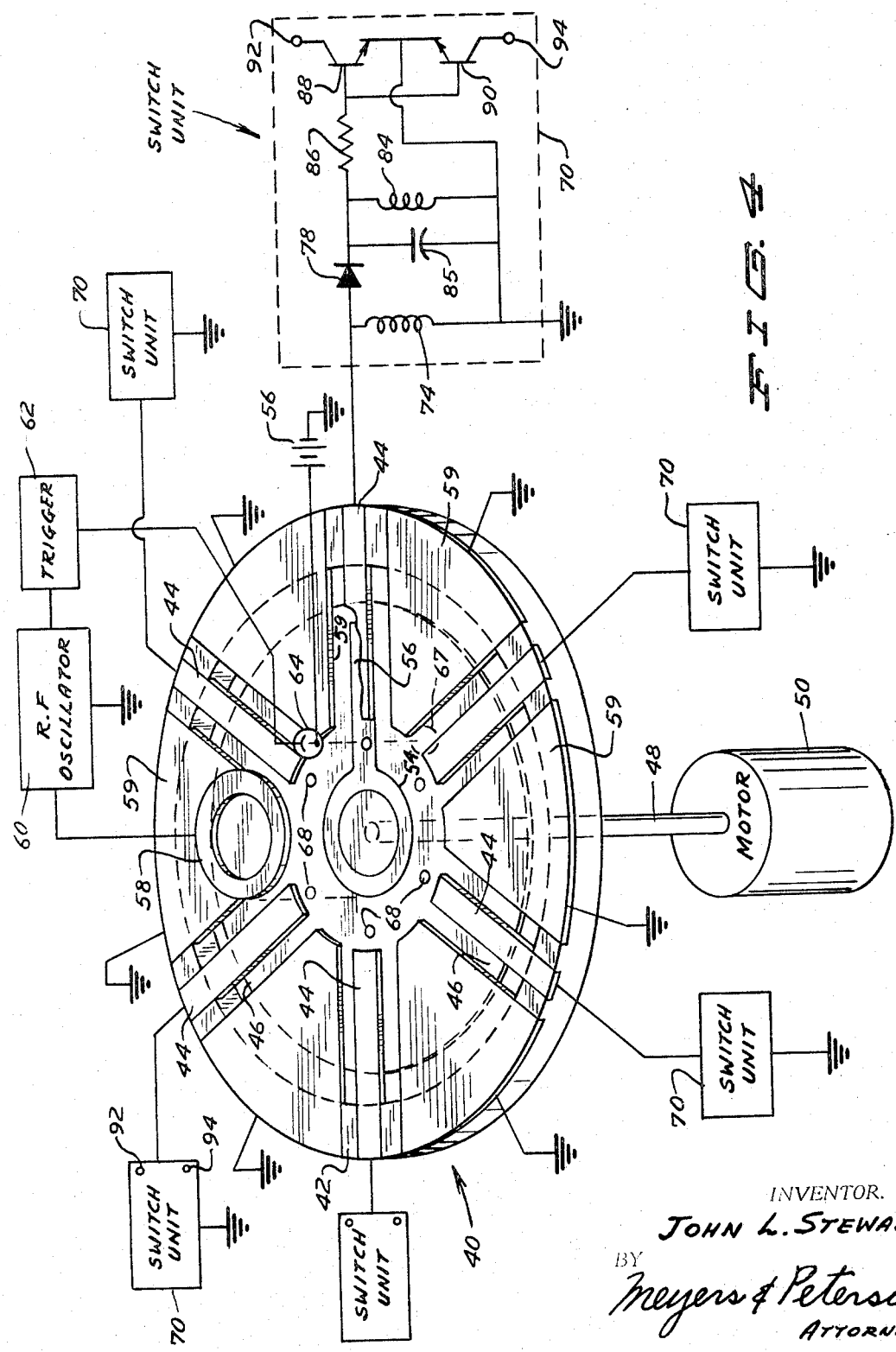

United States Patent Office 3,378,700
Patented Apr. 16, 1968

3,378,700
HIGH FREQUENCY SWITCHING SYSTEM
John L. Stewart, Menlo Park, Calif., assignor to Santa Rita Technology, Inc., Menlo Park, Calif., a corporation of Arizona
Filed Sept. 21, 1965, Ser. No. 488,984
5 Claims. (Cl. 307—254)

ABSTRACT OF THE DISCLOSURE

A plurality of fixedly disposed capacitor plates are arranged in an angularly spaced relation with each other and a second capacitor plate is rotated relative to the fixed plates. A transistorized switching unit is connected to each of the fixedly disposed plates so that whenever the movable plate comes into juxtaposition with a given fixed plate, the switch is changed from one conductive state to a different conductive state. Photoelectric means are employed for assuring that the switching unit is switched only when the movable capacitor plate is in alignment with one of the fixed plates.

---

This invention relates generally to electronic switching systems, and pertains more particularly to a radio-frequency operated switching system possessing considerable versatility, being usable in coding and decoding, modulation studies, correlation detectors, analog-to-digital converters and the like.

One object of the present invention is to provide a switching system in which the switching action takes place at a high rate. More specifically, the invention has for an aim the provision of such a system that will function very effectively when energized by a very high frequency sine wave.

The invention has for another object the provision of a switching system of the foregoing character that can be inexpensively manufactured.

Another object of this invention is to effectively isolate or separate the various circuits constituting the actual switches from the control circuitry which provides the triggering signals for the various individual switches. More specifically, the present invention obviates the need for any wiping contact, the invention making use of the small capacitive effect that causes each of the individual switches to change from one conductive state to another when a movable capacitor plate is brought into juxtaposition relative to any one of a set of fixedly disposed capacitor plates. Consequently, the invention has for an aim the elimination of actual contact between relatively movable parts, thereby prolonging the life of the system and at the same time minimizing the need for servicing.

A still further object of the invention is to provide a switching system of the foregoing character that lends itself readily to miniaturization. Therefore, the envisaged system can be made quite compact and employed in situations where space is at a premium.

Yet another object of the invention is to provide a switching system in which the control circuitry, even though energized with a sine wave signal, produces a sharp pulse signal that causes the switch in each instance to operate. In this regard, the invention provides a capacitive action in combination with a photoelectric action so that the movable capacitor plate is for all intents and purposes substantially in alignment or registry with a fixed capacitor plate before a signal is forwarded to the switch which signal causes it to change from one conductive state to another. Stated somewhat differently, the edge effects between the fixed capacitor plates and the movable capacitor plate is eliminated as would be the case if the movable and fixedly disposed plates were energized during the approach of the movable plate toward the fixed plate.

A still further object of the invention is to provide a switching system involving movable parts but allowing for relatively large tolerances as far as the distances between the relatively movable parts are concerned.

These and other objects and advantages of my invention will more fully appear from the following description, made in connection with the accompanying drawing, where like reference characters refer to the same or similar parts throughout the several views and in which:

FIGURE 1 is a schematic diagram portraying the basic concepts of my switching system, the circuit being shown in conjunction with a solar cell;

FIGURE 2 is a diagram resembling FIG. 1, but with the solar cell replaced with a tuned circuit, diode detector and filter, the coupling being via a very small mutual inductance in this instance;

FIGURE 3 is a view similar to FIG. 2, but utilizing capacitive coupling, and

FIGURE 4 is a combined pictorial and schematic view, the pictorial portion being a perspective view with the schematic diagram superimposed thereon.

Referring first to FIG. 1, a light source 10 has been depicted and through the agency of a rotatable mask 12 light is caused to impinge sequentially through apertures 14 onto a solar cell 16. A current limiting resistor 18 is connected at one end to one side of the cell 16 and the other end of the resistor 18 is connected to the bases of a pair of silicon transistors 20, 22. The emitters of these transistors 20, 22 are connected to the other side of the solar cell 16. The collector of the transistor 20 is connected to one output terminal 24 and the collector of the transistor 22 is connected to a second output terminal 26. The utilization of the two transistors 20, 22 provides a balancing function so that the voltage drop in one of these transistors resulting from the switched signal current caused by the stream of light pulses produced by the rotating mask 12 is largely cancelled by that in the other transistor. Stated somewhat differently, when the emitter-base junctions of the transistors 20, 22 are forward biased due to light striking the cell 16, the switch is closed between the terminals 24, 26, and is otherwise open when the light is blocked by the imperforate portion of the mask 12. Thus, the forward switch resistance is low and the open switch impedance is very large. The resistor 18 limits the current so that the solar cell 16 can operate most efficiently.

It will be recognized that the principal advantage of the system shown in FIG. 1 is that the switched terminals 24, 26 are almost entirely isolated electrically from the switching signal derived from the source 10 via the mask 12. As a result, a single light source and a plurality of apertures or perforations 14 in the mask 12 can sequence switch contacts in a variety of ways, which contacts are essentially isolated from one another. Consequently, the function of the solar cell 16 in the illustrative situation is to intercept the extremely high frequency light wave and "detect" it to a steady D-C voltage which is applied to the switch comprised of the transistors 20, 22. It must be recognized that the on-off periods of the transistor switch are very long compared to the period of the applied light wave frequency.

Instead of a light wave, an electromagnetic wave of much lower frequency such as 100 megacycles, can be employed, yet retaining most of the advantages of the solar cell system depicted in FIG. 1. In FIG. 2, a source 28 of radio frequency current has been substituted for the source 10 which is coupled via a very small mutual inductance 30 to a tuned circuit 32, diode detector 34 and appropriate filter 36, the circuit 32, detector 34 and filter 36 replacing the solar cell 16 in this embodiment.

In FIG. 3, capacitive coupling is emphasized, there being capacitors 38 instead of the inductance 30.

In both FIGS. 2 and 3, the coupling impedance between the switch terminals 24, 26 and the R-F source 28 is very large at frequencies that are much below the radio frequency—just as in the case of the solar cell arrangement of FIG. 1.

The switch composed of the transistors 20, 22 may be activated on an individual basis, or groups of such switch units may be sequenced. In this regard, attention is now directed to FIG. 4.

The pictorial portion of the view comprises a commutator in the exemplary instance, the commutator being generally denoted by the reference numeral 40. It will be seen that the commutator 40 comprises a stationary ring or frame 42 having extending radially inwardly a plurality of finger elements which constitute a set of fixed capacitor plates 44.

The commutator 40 further includes a disc 46 mounted at the upper end of a shaft 48 which shaft is rotatable through the agency of a motor 50, the rotation for the sake of discussion being in a clockwise direction.

It will be perceived that the disc 46 carries a conductive ring 54, the function of which will be presently described, and extending radially therefrom is a finger element constituting of a movable capacitor plate 56 which is cooperable with the fixedly disposed capacitor plates 44. The capacitor plate 54, which is in the form of a ring, is cooperable with a similarly configured capacitor plate 58. Hence, by way of summation at this point, it will be recognized that the plates 44 in conjunction with the rotatable plate 56 form individual capacitors each time the plate 56 is aligned with one of the plates 44. The plates 54 and 58, however, provide an additional capacitor which remains the same as far as the plate elements thereof are concerned, even though the plate 54 rotates wtih the disc 46. It will be appreciated that the capacitor plates 54, 56 may be quite thin and may if desired be evaporated onto the disc 46. Also, it is to be appreciated that the disc 46 can be of quite small diameter, the actual size thereof depending upon the number of fixed plates 44. Of course, only six fixed plates 44 have been depicted but it will be understood that any number of these plates can be utilized, depending upon the result to be achieved. Solely as an illustration, a disc 46 having a five inch diameter will allow approximately 70 segments or fixed capacitor plates 44 to be employed with a width of approximately 0.20 inch. As for the finger or rotatable capacitor plate 56, it need be only approximately 0.020 inch in width or it may constitute a wire having this diameter. Still further, it is only necessary to have the plate 56 pass about 0.020 inch beneath the inwardly directed plates 44. It might be mentioned also that it makes little or no difference whether the commutator 40 is oriented as shown, inverted or turned through only 90 degrees. To help in reducing the coupling between the rotatable finger 56 and a fixed finger 44 not directly over the finger 56, grounded segmented plates 59 are interposed between the various fingers 44, being also mounted on the same ring 42 as are the fingers 44.

In the illustrated situation, a high-frequency source in the form of a radio-frequency oscillator 60 is utilized for energizing purposes. Actually, a rather high radio-frequency is utilized, being on the order of 100 mcs. Although it will be better understood hereinafter, at this time attention is called to the presence of a trigger circuit 62 which turns the oscillator 60 on and off whenever a photodiode 64 which is energized by a voltage source 66 receives light from a source 67 fixedly situated beneath the disc 46. The manner in which the light is allowed to pass through the disc 46 via a plurality of small holes 68, there being one such hole 68 in direct alignment with the finger or capacitor plate 56. The function of the photodiode 64 and the trigger circuit 62 controlled thereby will be explained in greater detail in connection with a typical operational sequence hereinafter presented.

Since we have more or less arbitrarily selected six fixed capacitor plates 44 to illustrate the invention, an equal number of switch units 70 are employed. One such unit 70 is schematically portrayed in the figure and it will be discerned that a conductor connects with the particular fixed capacitor plate 44 residing in the three o'clock position and leads to an inductor 74. At this stage of the description, it might be well to explain that the inductor 74 constitutes a portion of a resonating circuit which includes the stray capacitance of the conductors constituting the circuitry but more importantly in connection with any one of the capacitor plates 44 when the capacitor plate 56 is in alignment therewith.

A radio frequency detector diode 78 converts the radio-frequency signal to a direct current signal so as to provide a voltage across a filter circuit comprised of the inductor 84 and capacitor 85. When the signal is adequate, which occurs when the movable capacitor plate 56 is passing beneath one of the fixed capacitor plates 44, then such a signal is applied to the base-emitter junctions of transistors 88 and 90 to cause conduction of said transistors. It is desirable to minimize the loading on the resonant circuit that has been mentioned above and to accomplish this a current limiting resistor 86 is connected in series with the base of transistor 88 and also to the base of a transistor 90. The collectors of the transistors 88 and 90 are connected to output terminals 92 and 94, respectively. The utilization of the two transistors 88, 90 provides a balancing function so that the voltage drop in one of these transistors resulting from the switched signal current is largely cancelled by that in the other transistor, as with the earlier-mentioned transistors 20, 22. By using silicon transistors, a small equivalent of voltage generator effect is present so that the switching signal must achieve this voltage, being on the order of only 0.3 or 0.4 volt, in order to activate the switch 70. Consequently, the switch 70, when the movable capacitor plate 56 is brought into alignment with any one of the six capacitor plates 44 will cause the switch unit 70 that is associated with that particular fixed capacitor plate 44 to be changed from one conductive state to its other.

A feature of the present invention, however, resides in not allowing the signal applied to the various switch units 70 to gradually build up but to wait until the movable capacitor plate 56 is in substantial alignment or registry with one of the fixed capacitor plates 44. It is for this reason that the holes 68 are formed in the rotatable disc 46. When one of the holes 68 is between the photodiode 64 and light source 69, then light energy is allowed to impinge upon the photodiode 64 to cause the trigger circuit 62 to turn on or engage the oscillator 60 and to apply a high-frequency signal to the commutator 40. By doing this, the otherwise produced edge effects are eliminated. Stated somewhat differently, as the movable capacitor plate 56 approaches any one of the fixed capacitor plates 44, the maximum degree of coupling is not immediately reached and a signal builds up which is forwarded to the particular switch unit 70 without the full capacitive effect being delivered at that instant. Thus, somewhat of a delay is imparted to the system so that a sharp signal is transmitted to the particular switch unit 70. It will be appreciated that this occurs even when a sine wave signal is generated by the oscillator 60. Consequently, the transistors 88 and 90 are driven into a conductive state to turn on the switch unit 70 very rapidly which is quite desirable in many situations.

The versatility of my switching system should be manifest from the foregoing description. While the invention has been specifically described in conjunction with the showing of the commutator 40 which makes use of a constant speed motor 50, nonetheless the motor 50 could be reversely rotated and various accessory equipment utilized so that different switch units 70 are operated. In other words, it is not necessary that the switch units 70 be turned on and off in succession or sequence, for various coding operations can be performed. For instance, it has already been mentioned that the invention will find utility in converting from one code to another and also it has been mentioned that the invention would be suitable for analog-to-digital conversion. Thus, almost any pattern of switch energization may be undertaken, the particular pattern depending upon the particular application to which the invention is put.

It will, of course, be understood that various changes may be made in the form, details, arrangements and proportions of the parts without departing from the scope of my invention as set forth in the appended claims.

I claim:

1. A high-speed switching system comprising a plurality of fixedly disposed elements arranged in an angularly spaced relation with each other so as to form a set of first capacitor plates, a rotatable element constituting a second capacitor plate movable relative to said first capacitor plates, means for applying an alternating current signal between said first and second plates, and an electronic switch unit including a pair of transistors having conductive and non-conductive states, said transistors normally being biased into their non-conductive state, there being one such unit connected to each of said first plates and capable of being coupled between the first plate to which it is connected and said second plate, whereby when said second plate is moved into alignment with one of said first plates the particular unit associated with that first plate will have its said transistors changed from their non-conductive state to their conductive state.

2. A high-speed switching system in accordance with claim 1 including a grounded plate interposed between adjacent first capacitor plates.

3. A high-speed switching system comprising a plurality of fixedly disposed elements arranged in an angularly spaced relation with each other so as to form a set of first capacitor plates, a rotatable element constituting a second capacitor plate movable relative to said first capacitor plates, means for applying an alternating current signal between said first and second plates, and an electronic switch unit having on and off states, there being one such unit connected to each of said first plates and capable of being coupled between the first plate to which it is connected and said second plate, whereby when said second plate is moved into alignment with one of said first plates the particular unit associated with that first plate will be switched from one of said states to the other of said states.

4. A high-speed switching system in accordance with claim 3 including a rotatable disc, said second plate being carried on said disc for rotation therewith, and photoelectric means for controlling said alternating current signal means to apply a potential to said first and second plates only when said second plate is in direct alignment with a first plate.

5. A high-speed switching system in accordance with claim 4 in which said disc has a first hole therein having the same angular orientation as said movable plate and additional holes having the same angular spacing with respect to said first hole as said fixed plates have with respect to each other, and said photoelectric means includes a photodiode fixedly facing one side of said disc and a light source facing the other side of said disc, whereby light from said light source impinges on said photodiode only when one of said holes is therebetween to energize said signal means only when said movable plate is in direct alignment with one of said fixed plates.

References Cited

UNITED STATES PATENTS

| | | | |
|---|---|---|---|
| 2,962,603 | 11/1960 | Bright | 307—88.5 |
| 3,213,458 | 10/1965 | Hansel et al. | 343—854 XR |
| 3,284,637 | 11/1966 | Berry | 307—88.5 |

JOHN S. HEYMAN, *Primary Examiner.*

ARTHUR GAUSS, *Examiner.*

J. ZASWORSKY, *Assistant Examiner.*